(12) United States Patent
Takegoshi

(10) Patent No.: US 7,975,285 B2
(45) Date of Patent: Jul. 5, 2011

(54) BROADCAST RECEIVER AND OUTPUT CONTROL METHOD THEREOF

(75) Inventor: Masatoshi Takegoshi, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 90 days.

(21) Appl. No.: 12/563,036

(22) Filed: Sep. 18, 2009

(65) Prior Publication Data

US 2010/0169925 A1 Jul. 1, 2010

(30) Foreign Application Priority Data

Dec. 26, 2008 (JP) ................. 2008-333806

(51) Int. Cl.
  *H04N 5/455* (2006.01)
  *H04N 3/24* (2006.01)
(52) U.S. Cl. .............. 725/151; 348/706; 348/738
(58) Field of Classification Search .............. None
  See application file for complete search history.

(56) References Cited

FOREIGN PATENT DOCUMENTS

| JP | 06-133238 | 5/1994 |
|---|---|---|
| JP | 06-133238 A | 5/1994 |
| JP | 2006-270250 A | 10/2006 |
| JP | 2008-035399 | 2/2008 |
| JP | 2008-035399 A | 2/2008 |
| JP | 2008-067279 | 3/2008 |
| JP | 2008-067279 A | 3/2008 |
| JP | 2008-078888 | 4/2008 |
| JP | 2008-078888 A | 4/2008 |
| WO | WO 2007/072791 A1 | 6/2007 |

OTHER PUBLICATIONS

Explanation of Non-English Language References.
Notice of Rejection mailed by Japan Patent Office on Jun. 29, 2010 in the corresponding Japanese patent application No. 2010-121345.

*Primary Examiner* — Andrew Y Koenig
*Assistant Examiner* — Rong Le
(74) *Attorney, Agent, or Firm* — Knobbe, Martens, Olson & Bear LLP

(57) ABSTRACT

According to one embodiment, a broadcast receiver is configured to receive a broadcast signal and output the broadcast signal to an external device. The broadcast receiver includes a program information obtaining module, a storage module, and a channel selection detector. The program information obtaining module obtains program information from the broadcast signal. The storage module stores the program information obtained by the program information obtaining module. The channel selection detector detects an operation of selecting a channel. When the channel selection detector detects that a channel is selected, the broadcast receiver controls the external device to mute audio output. The channel selection detector also reads program information corresponding to the selected channel from the storage module and output the program information.

2 Claims, 11 Drawing Sheets

| PARAMETER | | CHANGE RANGE | CATEGORY | | |
|---|---|---|---|---|---|
| | | | SPORTS | MOVIE | NEWS |
| SURROUND | | 0 TO 10 | 8 | 3 | 5 |
| LOUDNESS | | 0 TO 10 | 0 | 5 | 10 |
| EQUALIZER | 50 Hz | ±50 | -30 | 10 | 30 |
| | 1 kHz | ±50 | -10 | 0 | 50 |
| | 10 kHz | ±50 | 0 | 10 | 30 |

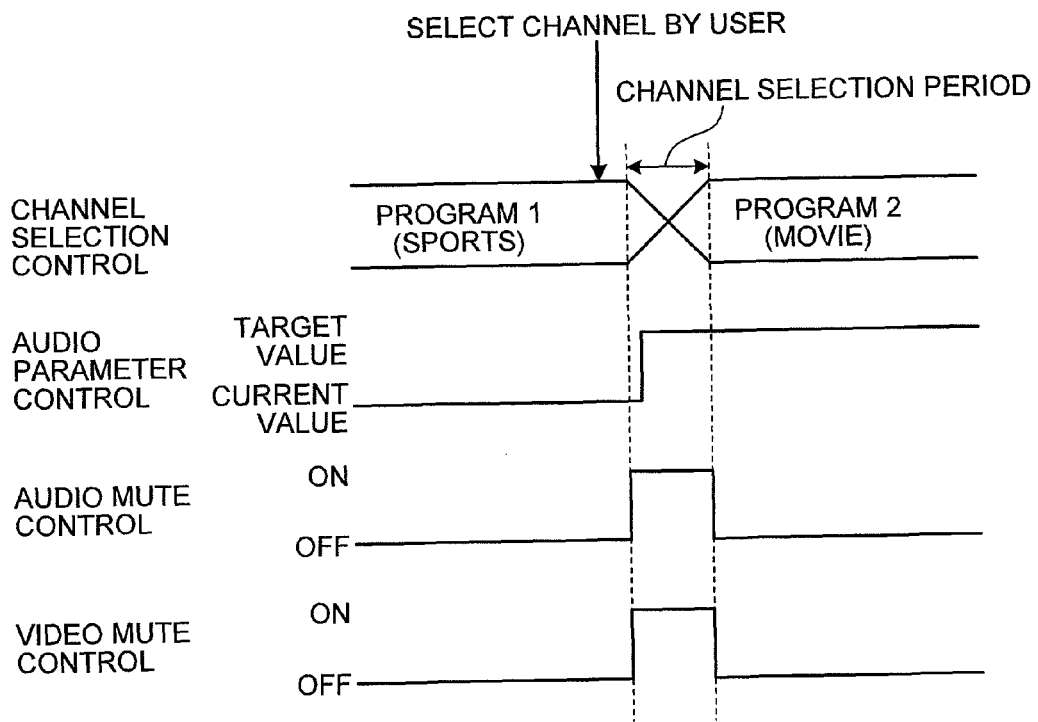
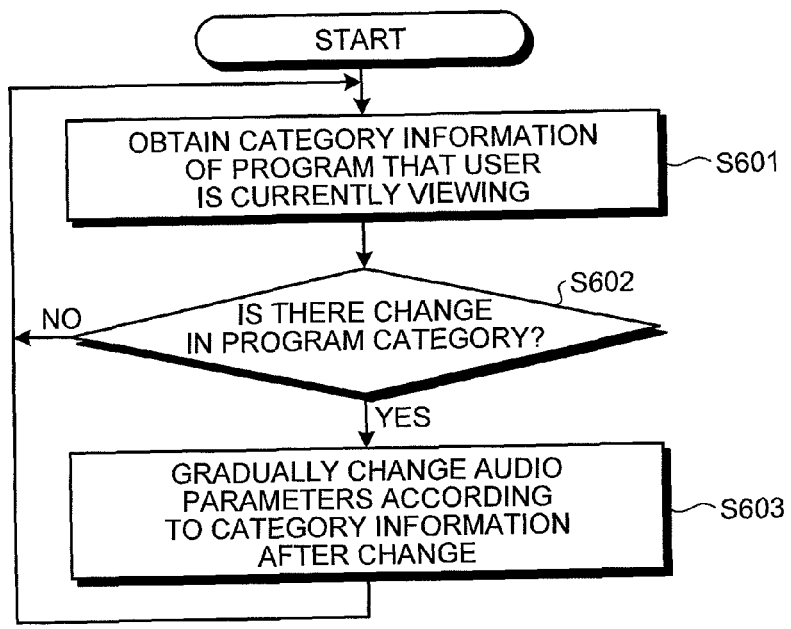

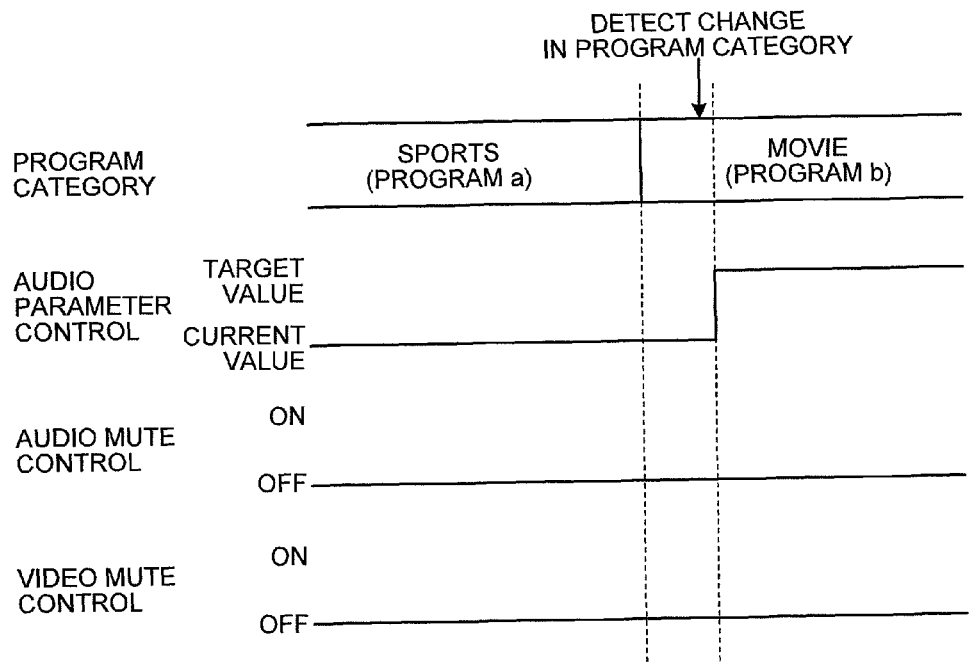
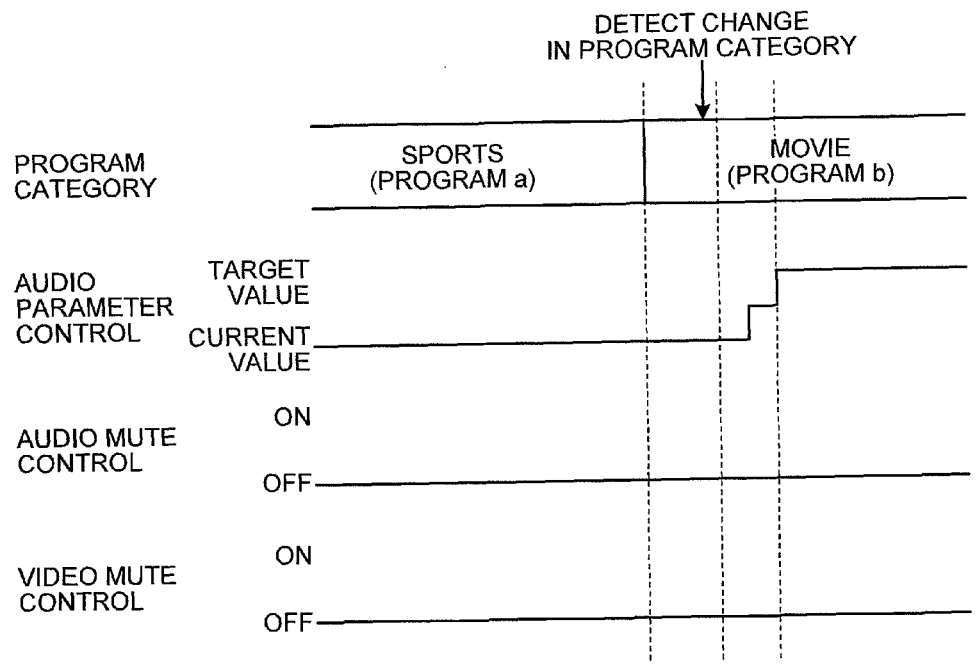

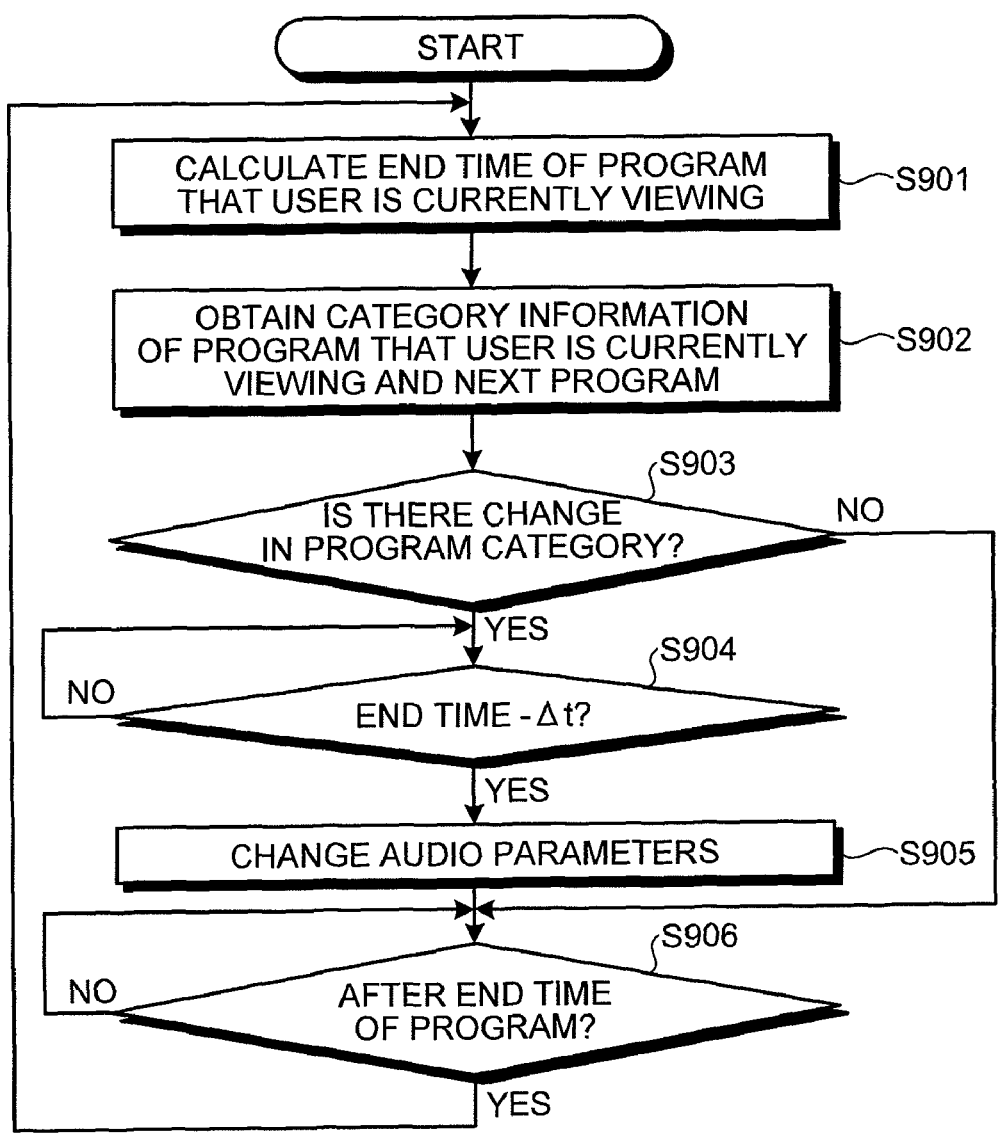

BROADCAST RECEIVER AND OUTPUT CONTROL METHOD THEREOF

CROSS-REFERENCE TO RELATED APPLICATIONS

This application is based upon and claims the benefit of priority from Japanese Patent Application No. 2008-333806, filed on Dec. 26, 2008, the entire contents of which are incorporated herein by reference.

BACKGROUND

1. Field

One embodiment of the invention relates to a broadcast receiver that receives a broadcast signal and outputs video and audio of the broadcast signal and an output control method thereof.

2. Description of the Related Art

There have been used digital televisions (TVs) that automatically set audio parameters for controlling audio output based on category information on a program that the user is viewing (see, for example, Japanese Patent Application Publication (KOKAI) No. H06-133238). Examples of audio parameters include those for surround, loudness, and equalizer. Since such a digital TV automatically sets the audio parameters, the user can be provided with an audio environment suitable for each program without manually setting the audio parameters suitable for the program. The audio environment suitable for a program indicates, for example, a surround sound environment that makes the scene alive if the program is a sport program, or an environment where an intermediate frequency band is enhanced so that the announcer can be clearly heard if the program is a news program.

The conventional technology disclosed in Japanese Patent Application Publication (KOKAI) No. H06-133238 does not take into account the timing to set the audio parameters. For example, when the audio parameters are changed based on the category information after a channel is selected, the current values of the audio parameters are changed at once (at a time) to target values. As a result, tone, volume, and the like suddenly change, and the user who notices this change feels uncomfortable. To eliminate the uncomfortable feeling, if the mute period is prolonged for audio and video outputs, then the outputs delay.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 5 is an exemplary timing chart for explaining timing to change the audio parameters upon selecting a channel in the first embodiment;

FIG. 6 is an exemplary flowchart of the operation of an audio/video output control mechanism according to a second embodiment of the invention;

FIG. 7 is an exemplary timing chart for explaining timing to change audio parameters when program category changes during continuous viewing of programs according to a conventional technology;

FIG. 8 is an exemplary timing chart for explaining timing to change audio parameters when program category changes during continuous viewing of programs in the second embodiment;

FIG. 9 is an exemplary flowchart of the operation of an audio/video output control mechanism according to a third embodiment of the invention;

DETAILED DESCRIPTION

Figure 1:
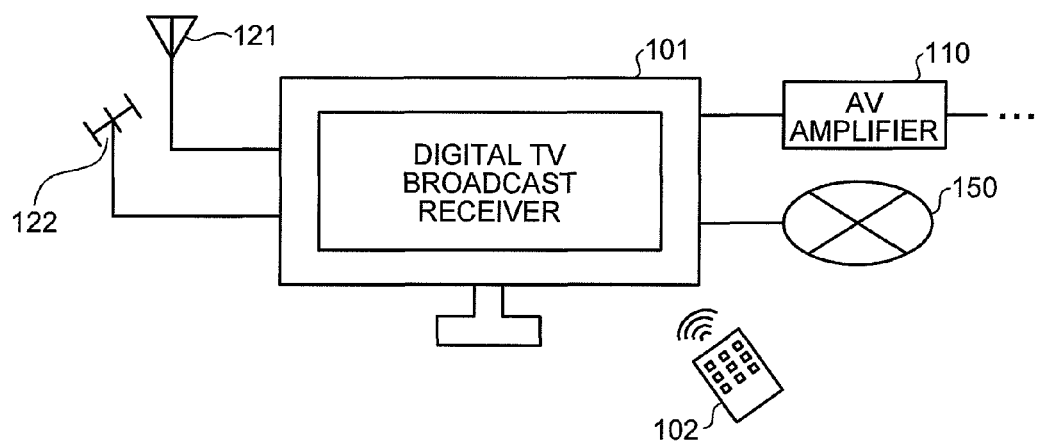
FIG. 1 is an exemplary schematic diagram of a use environment of a digital television (TV) broadcast receiver according to an embodiment of the invention.

Various embodiments according to the invention will be described hereinafter with reference to the accompanying drawings. In general, according to one embodiment of the invention, a broadcast receiver is configured to receive a broadcast signal and output the broadcast signal to an external device. The broadcast receiver comprises a program information obtaining module, a storage module, and a channel selection detector. The program information obtaining module is configured to obtain program information from the broadcast signal. The storage module is configured to store the program information obtained by the program information obtaining module. The channel selection detector is configured to detect an operation of selecting a channel. When the channel selection detector detects that a channel is selected, the broadcast receiver controls the external device to mute audio output, and reads program information corresponding to the channel from the storage module to output the program information.

According to another embodiment of the invention, a broadcast receiver is configured to receive a broadcast signal and output the broadcast signal to an external device. The broadcast receiver comprises a category information obtaining module configured to obtain category information indicating the category of a program currently being displayed from the broadcast signal. When the category information changes to new category information indicating the category of another program, the broadcast receiver outputs the new category information together with information indicating that the other program is being displayed to gradually adjust audio output based on the new category information.

According to still another embodiment of the invention, there is provided an output control method applied to a broadcast receiver configured to receive a broadcast signal and output the broadcast signal to an external device. The output control method comprising: a program information obtaining module obtaining program information from the broadcast signal; storing the program information obtained by the program information obtaining module in a storage module; a channel selection detector detecting an operation of selecting a channel; and controlling, when the channel selection detector detects that a channel is selected, the external device to mute audio output, and reading program information corresponding to the channel from the storage module to output the program information.

According to still another embodiment of the invention, there is provided an output control method applied to a broadcast receiver configured to receive a broadcast signal and output the broadcast signal to an external device. The output control method comprising: a category information obtaining module obtaining category information indicating the category of a program currently being displayed from the broadcast signal; and outputting, when the category information changes to new category information indicating the category of another program, the new category information together with information indicating that the other program is being displayed to gradually adjust audio output based on the new category information.

Incidentally, digital television broadcasting is standardized, and the details defined by the standard will not be described herein.

FIG. 1 is a schematic diagram of the use environment of a digital television (TV) broadcast receiver 101 according to an embodiment of the invention.

As illustrated in FIG. 1, an antenna 121 for receiving BS/CS digital broadcasting and an antenna 122 for receiving digital terrestrial broadcasting are connected to the input side of the digital TV broadcast receiver 101. The digital TV broadcast receiver 101 is connected to a peripheral device and a device connected to a network 150 via various input/output interfaces (I/F). The digital TV broadcast receiver 101 may be connected to an external device such as a display device and an audio output device directly or via an AV amplifier 110. The user can operate the digital TV broadcast receiver 101 using an operation module (not illustrated in FIG. 1) provided thereto or a remote controller 102 via infrared communication.

Upon receipt of a digital TV broadcast signal, the digital TV broadcast receiver 101 decodes it, thereby displaying a broadcast program to allow the user to view the broadcast program. The user may view the broadcast program using an external device such as a display device and an audio output device. Further, the broadcast program can be recorded.

While the digital TV broadcast receiver 101 is illustrated in FIG. 1 (and FIG. 2) as having only two systems, one for receiving BS/CS digital broadcasting and the other for receiving digital terrestrial broadcasting, this is for notational simplicity only. The digital TV broadcast receiver 101 may be provided with a plurality of receiver circuits such as tuners for receiving BS/CS digital broadcasting and also those for receiving digital terrestrial broadcasting to record programs on multiple channels.

Figure 2:
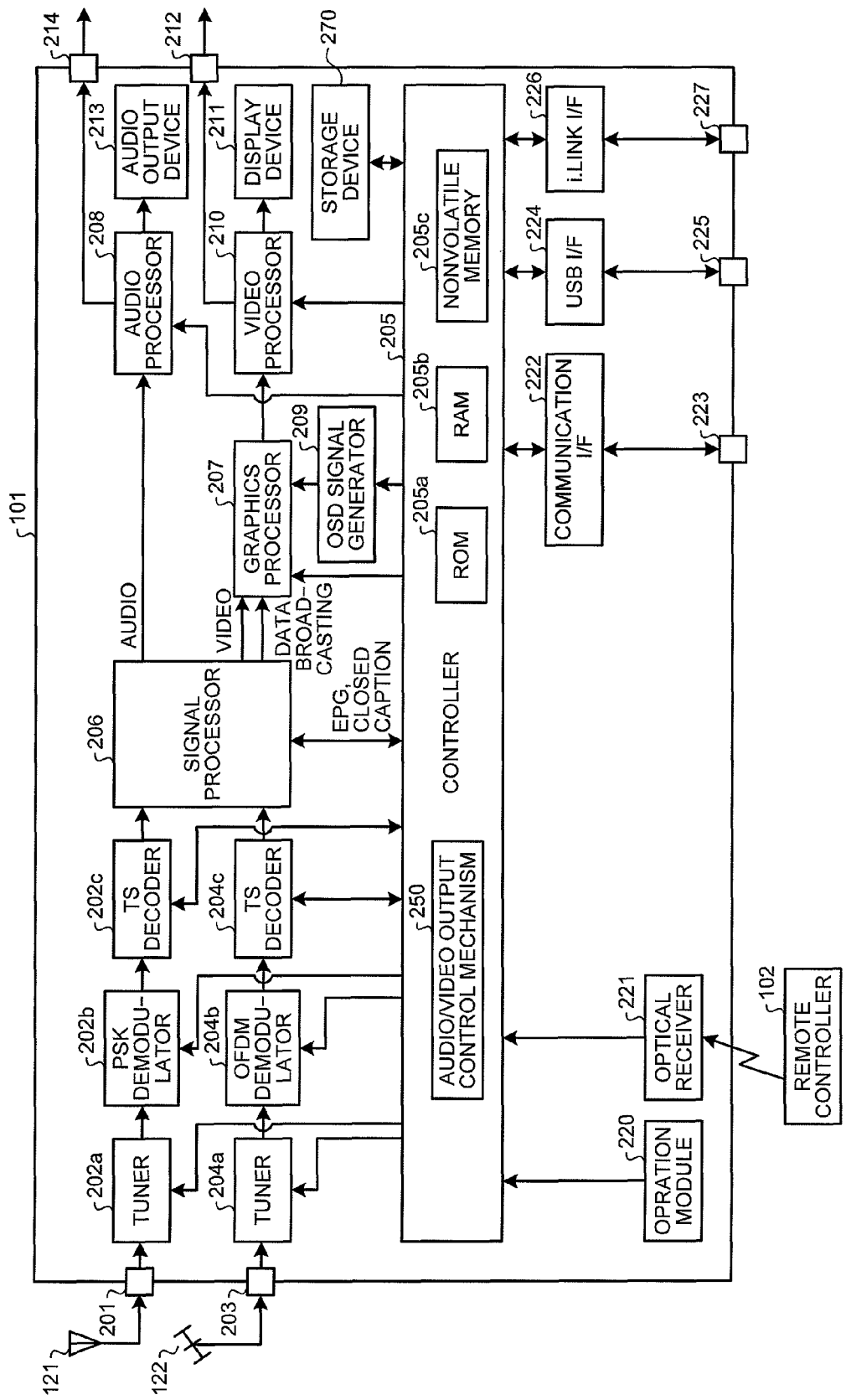
FIG. 2 an exemplary block diagram of a signal processing system of the digital TV broadcast receiver in the embodiment.

A description will be given of the hardware configuration of the digital TV broadcast receiver 101. FIG. 2 is a block diagram of a signal processing system of the digital TV broadcast receiver 101.

When the antenna 121 for receiving BS/CS digital broadcasting receives a satellite digital TV broadcast signal, the broadcast signal is sent to a tuner 202a for satellite digital broadcast via an input terminal 201.

According to a control signal from a controller 205, the tuner 202a selects a broadcast signal from a desired channel, and outputs the broadcast signal to a phase shift keying (PSK) demodulator 202b.

The PSK demodulator 202b demodulates the broadcast signal received from the tuner 202a according to a control signal from the controller 205. Thus, the PSK demodulator 202b acquires a transport stream (TS) containing a desired program, and outputs it to a TS decoder 202c.

The TS decoder 202c performs TS decoding on a multiplexed TS signal according to a control signal from the controller 205. The TS decoder 202c also depacketizes digital video and audio signals of the desired program to obtain a packetized elementary stream (PES). The TS decoder 202c then outputs the PES to an STD buffer (not illustrated) in a signal processor 206. In addition, the TS decoder 202c sends section information transmitted through digital broadcasting to a section processor (not illustrated) in the signal processor 206.

When the antenna 122 for receiving digital terrestrial broadcasting receives a digital terrestrial TV broadcast signal, the broadcast signal is sent to a tuner 204a for digital terrestrial broadcast via an input terminal 203.

According to a control signal from the controller 205, the tuner 204a selects a broadcast signal from a desired channel, and outputs the broadcast signal to an orthogonal frequency division multiplexing (OFDM) demodulator 204b.

The OFDM demodulator 204b demodulates the broadcast signal received from the tuner 204a according to a control signal from the controller 205. Thus, the OFDM demodulator 204b acquires a transport stream containing a desired program, and outputs it to a TS decoder 204c.

The TS decoder 204c performs TS decoding on a multiplexed TS signal according to a control signal from the controller 205. The TS decoder 204c also depacketizes digital video and audio signals of the desired program to obtain a PES. The TS decoder 204c then outputs the PES to the STD buffer in the signal processor 206. In addition, the TS decoder 204c sends section information transmitted via digital broadcasting to the section processor in the signal processor 206.

While a user is viewing a TV program, the signal processor 206 selectively performs predetermined digital signal processing on the digital video and audio signals received from the TS decoder 202c and those received from the TS decoder 204c. Then, the signal processor 206 outputs the video signal to a graphics processor 207 and the audio signal to an audio processor 208. On the other hand, while a program is being recorded, the signal processor 206 selectively performs predetermined digital signal processing on the digital video and audio signals received from the TS decoder 202c and those received from the TS decoder 204c. Then, the signal processor 206 stores the signals in a storage device 270 such as a hard disk drive (HDD) through the controller 205. While a recorded program is being reproduced, the signal processor 206 performs predetermined digital signal processing on data of the recorded program read from the storage device 270 through the controller 205. Then, the signal processor 206 outputs the data to the graphics processor 207 and the audio processor 208.

The controller 205 receives various types of data for obtaining a program such as key information for BS conditional access system (B-CAS) descrambling, electronic program guide (EPG) information, program attribute information such as program category, closed caption information such as program specific information (PSI) and service information (SI), and the like. That is, the controller 205 functions as a program information obtaining module and a category information obtaining module. From the received information, the controller 205 generates image data to display an EPG or closed captions, and outputs the image data to the graphics processor 207.

Besides, the controller 205 has the function of controlling the recording and programmed or timer recording of a program. When a user programs the recording of a program, the controller 205 displays EPG information on a display device 211. Having received input from the user through an operation module 220 or the remote controller 102, the controller 205 stores information specified by the user input in a predetermined storage module. Then, the controller 205 controls the tuners 202a and 204a, the PSK demodulator 202b, the OFDM demodulator 204b, the TS decoders 202c and 204c, and the signal processor 206 so that a specified program is to be recorded at a preset time.

From the section information received from the TS decoder 202c (204c), the section processor outputs to the controller 205 various types of data for obtaining a program, EPG information, program attribute information such as program category, closed caption information such as PSI and SI, and the like.

The graphics processor 207 synthesizes the following signals: (1) a digital video signal fed from an AV decoder (not illustrated) in the signal processor 206, (2) an on screen display (OSD) signal generated by an OSD signal generator 209, (3) image data of data broadcasting, and (4) an EPG/closed caption signal generated by the controller 205. The graphics processor 207 then outputs the synthesized signal to a video processor 210. In addition, to display a closed-captioned broadcast video or a program with closed captions, based on closed caption data under the control of the controller 205, the graphics processor 207 superimposes the closed caption data on the video signal.

The digital video signal output from the graphics processor 207 is input to the video processor 210. The video processor 210 converts the input digital video signal to an analog video signal in a format displayable on the display device 211. The video processor 210 then outputs the analog video signal to the display device 211 to display the video thereon. The video processor 210 may convert the digital video signal to an analog video signal in a format displayable on an external display device (not illustrated), and then outputs the analog video signal to the external display device via an output terminal 212 to display the video thereon.

The audio processor 208 converts the input digital audio signal to an analog audio signal in a format reproducible by an audio output device 213. The audio processor 208 then outputs the analog audio signal to the audio output device 213 to reproduce the audio thereon. The audio processor 208 may convert the digital audio signal to an analog audio signal in a format reproducible by an external audio output device (not illustrated), and then outputs the analog audio signal to the external audio output device via an output terminal 214 to reproduce the audio.

The controller 205 controls the overall operation of the digital TV broadcast receiver 101 including the operation of receiving various types of signals as described above. The controller 205 comprises a built-in central processing unit (CPU). Upon receipt of operation information from the operation module 220 or operation information sent from the remote controller 102 via an optical receiver 221, the controller 205 controls the respective modules to perform processing corresponding to the operation information (for example, channel switching).

The controller 205 performs this control using mainly a read only memory (ROM) 205a, a random access memory (RAM) 205b, and a nonvolatile memory 205c. The ROM 205a stores a control program executed by the CPU. The RAM 205b provides a work area to the CPU. The nonvolatile memory 205c may be, for example, a flash memory, and stores various types of setting information, control information, program information, and the like.

The controller 205 is connected via a communication interface (I/F) 222 to a local area network (LAN) terminal 223. With this, the controller 205 can communicate data with a LAN compatible device (for example, an external HDD) connected to the LAN terminal 223 through the communication I/F 222. In this case, the controller 205 has a dynamic host configuration protocol (DHCP) server function, and assigns an Internet protocol (IP) address to the LAN compatible device connected to the LAN terminal 230 to control it.

Similarly, the controller 205 is connected via a universal serial bus (USB) I/F 224 to a USB terminal 225. With this, the controller 205 can communicate data with various types of devices connected to the USB terminal 225 through the USB I/F 224.

Further, the controller 205 is connected via an i.LINK (registered trademark) I/F 226 to an i.LINK terminal 227. With this, the controller 205 can communicate data with various types of devices connected to the i.LINK terminal 227 through the i.LINK I/F 226.

The controller 205 comprises an audio/video output control mechanism 250 as an audio output control function. Although audio output control performed by the audio/video output control mechanism 250 will be described in detail later, video output can be controlled in the same manner.

A description will now be given of how to obtain program information.

Commonly used digital TV broadcast receivers such as digital TV broadcast recorders are generally provided with EPG function. With this EPG function, such a digital TV broadcast receiver obtains weekly program information (including program start time, program airtime, program category, etc.) from an event information table (EIT) contained in a digital TV broadcast signal.

In the case of BS digital broadcasting and 110° CS digital broadcasting, when a channel is selected, program information for all channels can be acquired. On the other hand, in the case of terrestrial digital broadcasting, program information is acquired with respect to each channel. Accordingly, to acquire program information for all channels, all the channels need to be once selected. Therefore, on a receiver with one tuner, the user is required to manually select all the channels, or all the channels need to be selected automatically while the user is not viewing a program. Meanwhile, a receiver with a plurality of tuners is capable of acquiring the program information by selecting all the channels using a tuner except for the one by which the user is viewing a program. Incidentally, the memory capacity necessary to store the weekly program information is 3 Mbytes.

In the following embodiments, program information acquired in the manner as above is used. By using the category information of a program obtained from program information that has already been acquired, it is possible to adjust the timing to change output control parameters for output control to impart a predetermined effect to audio and video while a channel is being selected. Thus, output control parameters can be changed to those suitable for the category of a program on a newly selected channel. As just described, the following embodiments take into account the timing to change output control parameters. Although a detailed description will be given of audio output control using audio parameters as output control parameters, the same applies to video output control.

Figures 3, 4:
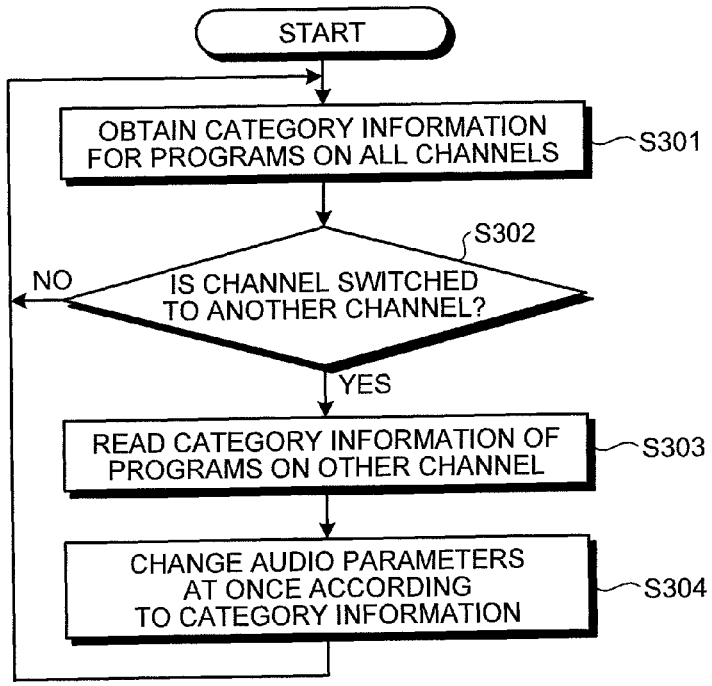
FIG. 3 is an exemplary flowchart of the operation of an audio/video output control mechanism according to a first embodiment of the invention.
FIG. 4 is an exemplary schematic diagram of a parameter table that stores category information in association with audio parameters in the first embodiment.

In the following, a first embodiment of the invention will be described. In the first embodiment, it is assumed, for example, that the category of programs that the user views changes to another in response to channel switching by the user. With reference to FIG. 3, a description will be given of the operation of the audio/video output control mechanism 250 according to the first embodiment. FIG. 3 is a flowchart of the operation of the audio/video output control mechanism 250 according to the first embodiment.

First, the audio/video output control mechanism 250 obtains current category information for programs on each channel from program information for all available channels that has already been acquired as described above (S301).

Next, the audio/video output control mechanism 250 determines whether the user switches a channel to another channel (S302). At this point, the audio/video output control mechanism 250 waits for channel switching by the user. However, a program may change to another program during the waiting period and the program category may also change accordingly. Therefore, the process returns to S301 as needed, and category information is obtained for programs on each channel at that point. Incidentally, channel switching is detected by the controller 205 based on operation information from the operation module 220 or the remote controller 102.

When the user switches a channel to another channel (Yes at S302), the process moves to S303. The audio/video output control mechanism 250 reads the category information for programs on the other channel from the category information for programs on each channel obtained at S301 (S303).

Thereafter, according to the category information read at S303, for example, with reference to a parameter table as illustrated in FIG. 4, the audio/video output control mechanism 250 sets audio parameters to values corresponding to the read category information, thereby changing the audio parameters to new audio parameters (S304). The audio/video output control mechanism 250 changes the audio parameters from current values to target values at once during a channel selection period (the audio parameters are changed all at once) as illustrated in FIG. 5.

In the example of FIG. 4, when the program category changes from "sports" to "movie", the audio/video output control mechanism 250 changes an audio parameter for loudness from 0 to 5 at a time. The audio/video output control mechanism 250 also changes an another audio parameter for surround from 8 to 3, i.e., a target value, at a time. In proportion to increases and decreases in the audio parameters, the intensity of the sound effect such as surround mode increases and decreases.

During the channel selection period (until the completion of channel switching), audio and video are controlled to be mute. During this period (mute period), the change of the audio parameters is completed. When programs before and after channel switching belong to the same category, the audio parameters are set to the same values in the above process. Therefore, in such a case, the process of changing the audio parameters may be skipped.

As described above, according to the first embodiment, the audio parameters are changed during the channel selection period. Therefore, the user does not notice the change in the audio parameters. Moreover, since audio and video mute periods need not be unnecessarily prolonged beyond the channel selection period, video and audio can be promptly output after setting optimal audio parameters for the category of a program on a selected channel.

In the following, a second embodiment of the invention will be described. In the second embodiment, it is assumed, for example, that, when the user continuously views programs on the same channel, a program "a" changes to another program "b" and the program category also changes accordingly. With reference to FIGS. 6 to 8, a description will be given of the operation of the audio/video output control mechanism 250 according to the second embodiment. FIG. 6 is a flowchart of the operation of the audio/video output control mechanism 250 according to the second embodiment. FIG. 7 is a timing chart for explaining timing to change audio parameters when program category changes during continuous viewing of programs according to a conventional technology. FIG. 8 is a timing chart for explaining timing to change audio parameters when program category changes during continuous viewing of programs according to the second embodiment.

First, the audio/video output control mechanism 250 obtains the category information of a program from a broadcast signal of a channel that the user is currently viewing (S601). The category information thus obtained is temporarily stored in a storage medium such as the RAM 2065b.

Then, the audio/video output control mechanism 250 determines whether there is a change in the category of the program that the user is currently viewing (S602). The audio/video output control mechanism 250 detects the change in program category by comparing category information previously obtained and stored in the storage medium with category information obtained this time. If the audio/video output control mechanism 250 determines that there is no change in program category (No at S602), the process returns to S601, and loops until the audio/video output control mechanism 250 detects a change in program category.

Having determined that there is a change in the category of the program that the user is currently viewing (Yes at S602), according to the category information after the change, for example, with reference to the parameter table as illustrated in FIG. 4, the audio/video output control mechanism 250 sets audio parameters to values corresponding to the category information, thereby changing the audio parameters to new audio parameters (S603). The audio/video output control mechanism 250 gradually changes the audio parameters since the detection of the change in program category. More specifically, in the example of FIG. 4, if the program category changes from "sports" to "movie", the audio/video output control mechanism 250 gradually changes the audio parameter for loudness from 0 through 3 to 5 during 0.5 to 1.0 second. The audio/video output control mechanism 250 gradually changes the other audio parameters for surround and the like to target values in this manner. After that, the process returns to S601, and the above process is repeated.

As illustrated in FIG. 7, according to a conventional technology, audio parameters are changed at once when a change is detected in program category. More specifically, in the example of FIG. 4, if the category of the program that the user is currently viewing changes from "sports" to "movie", the audio parameter for surround is changed from 8 to 3 at a time. Similarly, the other audio parameters for loudness and the like are also changed to target values at a time. As can be seen from FIG. 7, the audio parameters are changed not during a mute period but while the user is viewing a program. As a result, the user notices this change in the audio parameters and feels uncomfortable. On the other hand, according to the second embodiment, the audio parameters are gradually changed as illustrated in FIG. 8. Thus, it is possible to reduce uncomfortable feeling at the time the audio parameters change as compared to the conventional technology in which the audio parameters are changed at once.

Figure 10:
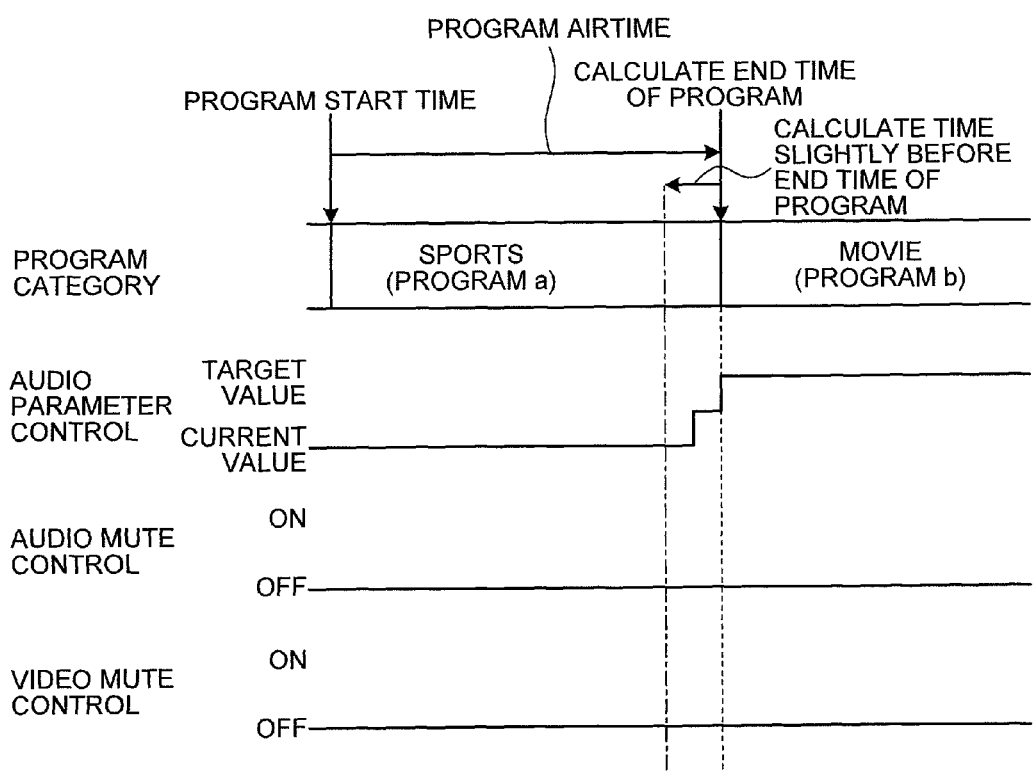
FIG. 10 is an exemplary timing chart for explaining timing to change audio parameters when program category changes during continuous viewing of programs in the third embodiment.

In the following, a third embodiment of the invention will be described. In the third embodiment, as in the second embodiment, it is assumed, for example, that, when the user continuously views programs on the same channel, a program "a" changes to another program "b" and the program category also changes accordingly. With reference to FIGS. 9 and 10, a description will be given of the operation of the audio/video output control mechanism 250 according to the third embodiment. FIG. 9 is a flowchart of the operation of the audio/video output control mechanism 250 according to the third embodiment. FIG. 10 is a timing chart for explaining timing to change audio parameters when program category changes during continuous viewing of programs according to the third embodiment.

First, the audio/video output control mechanism 250 obtains the program start time and the program airtime from program information for all available channels that has already been acquired as described above. The audio/video output control mechanism 250 then calculates the end time of a program that the user is viewing based on the program start time and the program airtime (S901).

Subsequently, the audio/video output control mechanism 250 obtains the category information of the program that user is currently viewing and that of a program broadcast next from the program information (S902).

After that, the audio/video output control mechanism 250 determines whether there is a change in program category when the program currently viewed by the user ends and the next program starts based on the program information (S903).

When determining that there is a change in program category when the program currently viewed by the user ends and the next program starts (Yes at S903), the audio/video output control mechanism 250 waits until the time a predetermined time period Δt (Δt>0) before the end time of the program (S904). While the predetermined time period Δt is set here such that the change of the audio parameters can be completed until the end time of the program that the user is viewing, it may be set such that the time at which the change of the audio parameters is completed is slightly past the end time of the program that the user is viewing.

When the current time reaches the time the predetermined time period Δt before the end time of the program (Yes at S904), the process moves to S905. According to the category information of the next program, for example, with reference to the parameter table as illustrated in FIG. 4, the audio/video output control mechanism 250 sets audio parameters to values corresponding to the category information of the next program, thereby changing the audio parameters to new audio parameters (S905). At this time, the audio/video output control mechanism 250 gradually changes the audio parameters as in the same manner as previously described in the second embodiment.

After the audio parameters are changed at S905, the process moves to S906. The audio/video output control mechanism 250 waits until the end time of the program that the user is currently viewing, and when the current time is past the end time of the program (Yes at S906), the process returns to S901, and the above process is repeated. When the program currently viewed by the user and the next program belong to the same category and there is no change in program category (No at S903), the process moves from S903 to S906. When the current time is past the end time of the program (Yes at S906), the process returns to S901, and the above process is repeated. In the third embodiment, when it is determined that there is a change in program category at S903 after the process at S902, the audio/video output control mechanism 250 performs the process at S904 and the followings. Instead, the audio/video output control mechanism 250 may obtain only the category information of the next program at S902, and perform the process at S904 and the followings without performing the process at S903 even if there is no change in program category.

In the second embodiment described above, a change is detected in the category of the program that the user is viewing. When there is a change in program category, the audio parameters are gradually changed at that timing. On the other hand, according to the third embodiment, the program start time and the program airtime are obtained from program information that has already been acquired, and the end time of the program that the user is viewing is calculated based on the program start time and the program airtime. As described above, the audio parameters are gradually changed at the timing before the end time of the program. This is because the sound is highly likely to be mute or low volume near the end time of a program. Therefore, using this timing, the audio parameters are gradually changed based on the category information of the next program slightly before the end time of a program. That is, as illustrated in FIG. 10, the audio parameters are changed during a period before the end time of a program in which the audio level is supposed to be low. Thus, it is possible to further reduce uncomfortable feeling at the time the audio parameters change.

Figure 11:
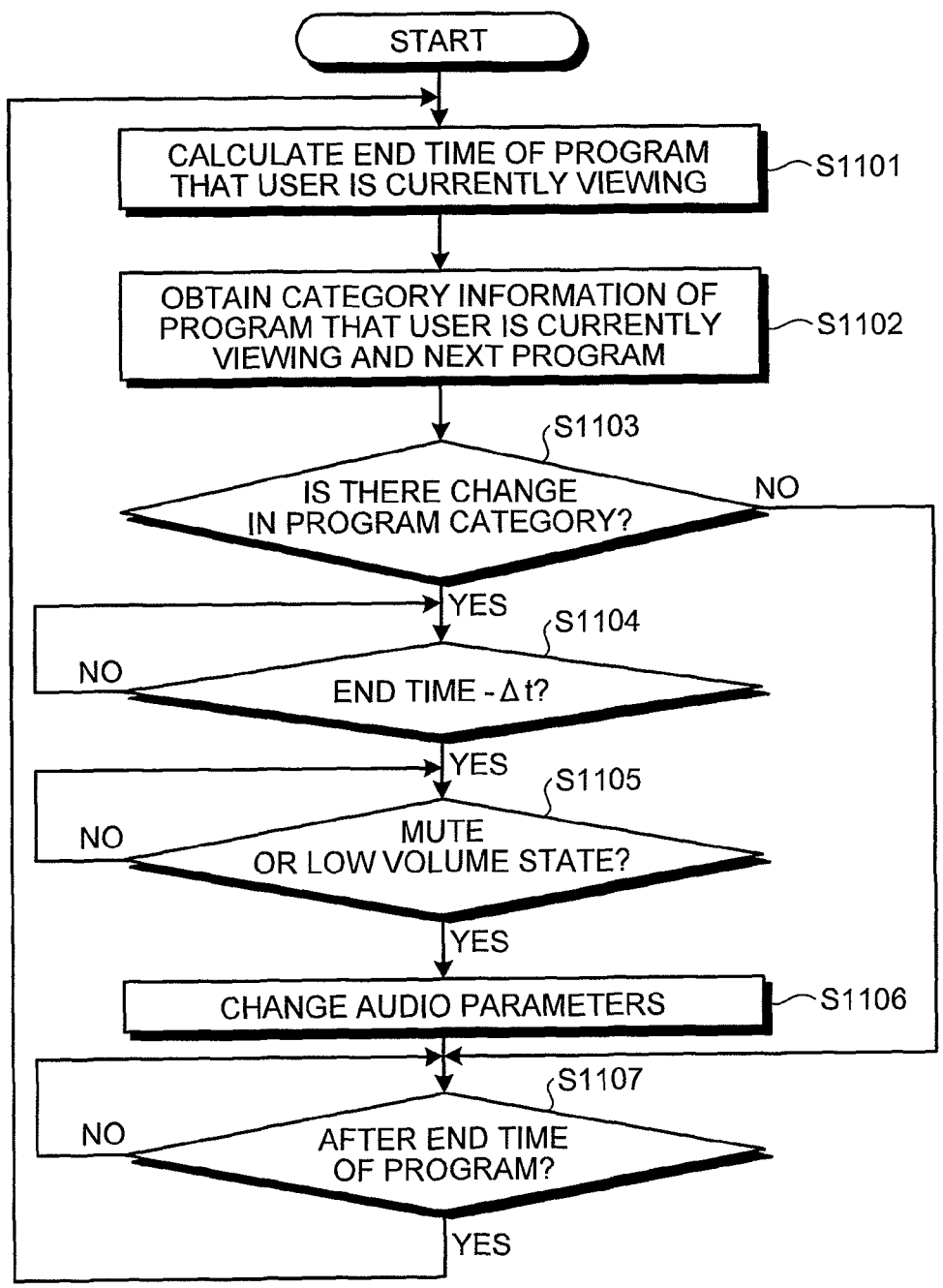
FIG. 11 is an exemplary flowchart of the operation of an audio/video output control mechanism according to a fourth embodiment of the invention.
Figure 12:
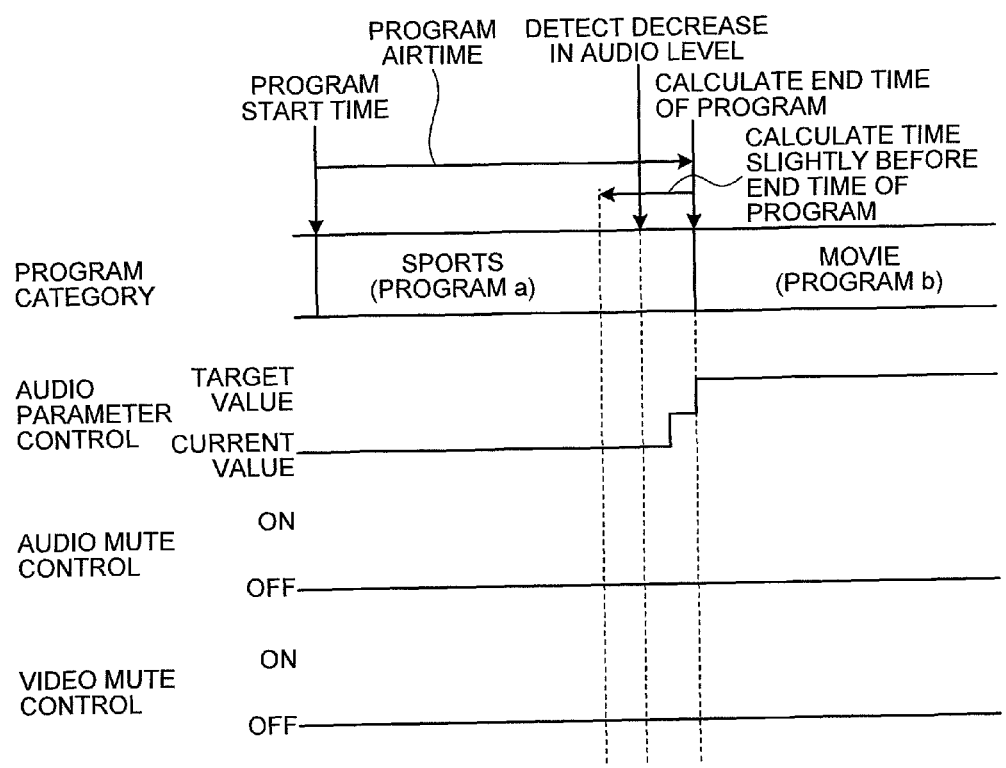
FIG. 12 is an exemplary timing chart for explaining timing to change audio parameters when program category changes during continuous viewing of programs in the fourth embodiment.

In the following, a fourth embodiment of the invention will be described. In the fourth embodiment, as in the second and third embodiments, it is assumed, for example, that, when the user continuously views programs on the same channel, a program "a" changes to another program "b" and the program category also changes accordingly. With reference to FIGS. 11 and 12, a description will be given of the operation of the audio/video output control mechanism 250 according to the fourth embodiment. FIG. 11 is a flowchart of the operation of the audio/video output control mechanism 250 according to the fourth embodiment. FIG. 12 is a timing chart for explaining timing to change audio parameters when program category changes during continuous viewing of programs according to the fourth embodiment.

First, the audio/video output control mechanism 250 obtains the program start time and the program airtime from program information for all available channels that has already been acquired as described above. The audio/video output control mechanism 250 then calculates the end time of the program that the user is viewing based on the program start time and the program airtime (S1101).

Subsequently, the audio/video output control mechanism 250 obtains the category information of the program that user is currently viewing and that of a program broadcast next from the program information (S1102).

After that, the audio/video output control mechanism 250 determines whether there is a change in program category when the program currently viewed by the user ends and the next program starts based on the program information (S1103).

When determining that there is a change in program category when the program currently viewed by the user ends and the next program starts (Yes at S1103), the audio/video output control mechanism 250 waits until the time a predetermined time period Δt (Δt>0) before the end time of the program (S1104). While the predetermined time period Δt is set here such that the change of the audio parameters can be completed until the end time of the program that the user is viewing, it may be set such that the time at which the change of the audio parameters is completed is slightly past the end time of the program that the user is viewing.

When the current time reaches the time the predetermined time period Δt before the end time of the program (Yes at S1104), the process moves to S1105. The audio/video output control mechanism 250 determines whether it is mute state or low volume state based on audio data in a data stream (for example, an MPEG 2 audio stream) that constitutes the program (S1105).

Having determined that it is mute state or low volume state (Yes at S1105), according to the category information of the next program, for example, with reference to the parameter table as illustrated in FIG. 4, the audio/video output control mechanism 250 sets audio parameters to values corresponding to the category information of the next program, thereby changing the audio parameters to new audio parameters (S1106). At this time, the audio/video output control mechanism 250 gradually changes the audio parameters as in the same manner as previously described in the second embodiment.

After the audio parameters are changed at S1106, the process moves to S1107. The audio/video output control mechanism 250 waits until the end time of the program that the user is currently viewing. When the current time is past the end time of the program (Yes at S1107), the process returns to S1101, and the above process is repeated. When the program currently viewed by the user and the next program belong to the same category and there is no change in program category (No at S1103), the process moves from S1103 to S1107. When the current time is past the end time of the program (Yes at S1107), the process returns to S1101, and the above process is repeated. In the fourth embodiment, when it is determined that there is a change in program category at S1103 after the process at S1102, the audio/video output control mechanism 250 performs the process at S1104 and the followings. Instead, the audio/video output control mechanism 250 may obtain only the category information of the next program at S1102, and perform the process at S1104 and the followings without performing the process at S1103 even if there is no change in program category.

In the third embodiment described above, the audio parameters are changed base on time information, i.e., the end time of a program. However, there may be a case that the sound is not mute or low volume near the end time of a program. Therefore, according to the fourth embodiment, it is determined whether it is mute state or low volume state. That is, as illustrated in FIG. 12, the audio parameters are changed during a time period in which the audio level is actually low. Thus, it is possible to further reduce uncomfortable feeling at the time the audio parameters change.

In the first to fourth embodiments described above, the digital TV broadcast receiver 101 controls audio/video output. In the following embodiments, a description will be given of the case where the audio/video output control mechanism 250 obtains program information and extracts the category information of a program from the program information, and controls the notification of the category information and the state of the user (channel switching state or program viewing state) to the AV amplifier 110. The AV amplifier 110 changes the audio parameters based on the category information and the state of the user (channel switching state or program viewing state) notified by the digital TV broadcast receiver 101, Incidentally, the digital TV broadcast receiver 101 transmits to the AV amplifier 110 information such as video signal output, audio signal output, and the notification of various types of additional information via high-definition multimedia interface-consumer electronics control (HDMI-CEC). Further, while the digital TV broadcast receiver 101 is provided with the parameter table exemplified in FIG. 4 in the first to fourth embodiments, the AV amplifier 110 is provided with the parameter table in the following embodiments.

Figure 13:
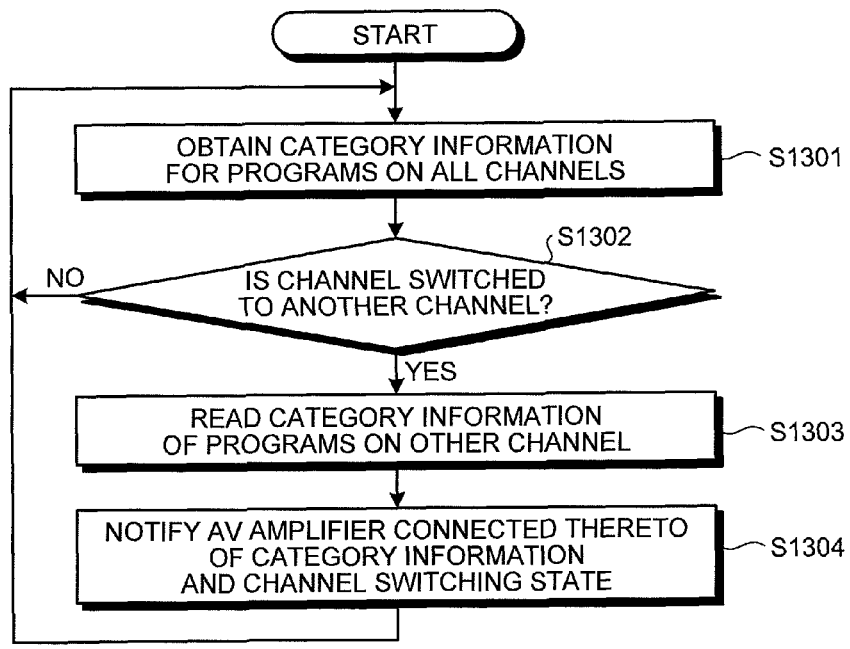
FIG. 13 is an exemplary flowchart of the operation of an audio/video output control mechanism according to a fifth embodiment of the invention.
Figure 14:
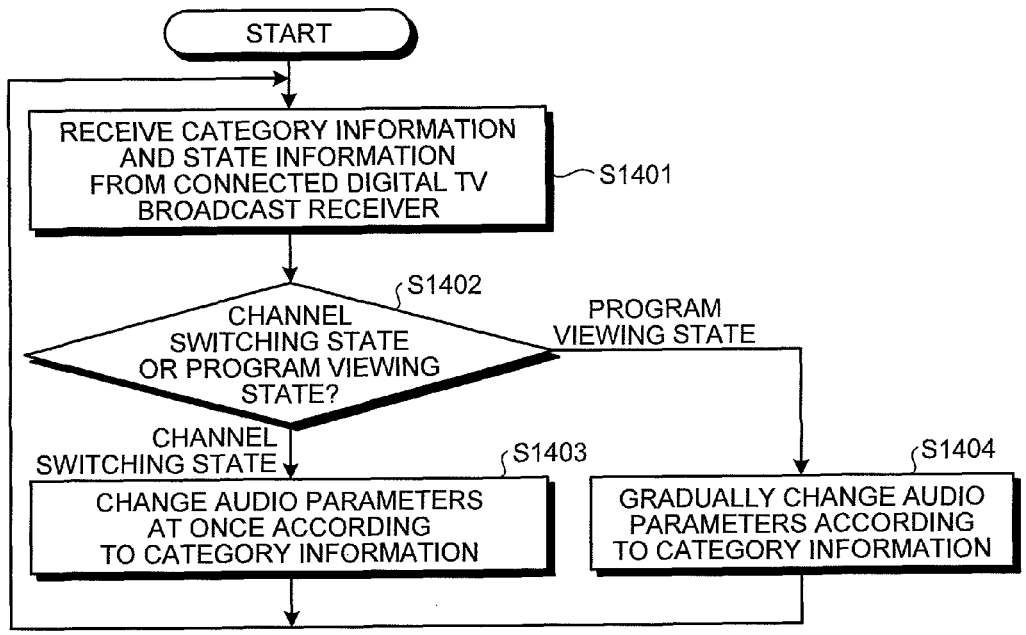
FIG. 14 is an exemplary flowchart of the operation of a controller of an AV amplifier according to the fifth embodiment, and a sixth embodiment and a modification of the embodiments of the invention.

In the following, a fifth embodiment of the invention will be described. In the fifth embodiment, it is assumed, for example, that the category of the program that the user views changes to another in response to channel switching by the user. With reference to FIGS. 13 and 14, a description will be given of the operation of the audio/video output control mechanism 250 and the AV amplifier 110 according to the fifth embodiment. FIG. 13 is a flowchart of the operation of the audio/video output control mechanism 250 according to the fifth embodiment. FIG. 14 is a flowchart of the operation of a controller of the AV amplifier 110 according to the fifth embodiment, and a sixth embodiment and a modification of the embodiments, which will be described later.

First, the audio/video output control mechanism 250 obtains current category information for programs on each channel from program information for all available channels that has already been acquired as described above (S1301).

Next, the audio/video output control mechanism 250 determines whether the user switches a channel to another channel (S1302). At this point, the audio/video output control mechanism 250 waits for channel switching by the user. However, a program may change to another program during the waiting period and the program category may also change accordingly. Therefore, the process returns to S1301 as needed, and category information is obtained for programs on each channel at that point. Incidentally, channel switching is detected by the controller 205 based on operation information from the operation module 220 or the remote controller 102.

When the user switches a channel to another channel (Yes at S1302), the process moves to S1303. The audio/video output control mechanism 250 reads the category information of programs on the other channel from the category information for programs on each channel obtained at S1301 (S1303).

Subsequently, the audio/video output control mechanism 250 notifies the AV amplifier 110 connected thereto of a combination of the category information and state information (in the fifth embodiment, "channel switching state") (S1304). More specifically, when the user switches a channel to another channel, if the category information of a program on the other channel indicates "sports", the audio/video output control mechanism 250 notifies the AV amplifier 110 of "sports" as the category information and "channel switching state" as the state information.

Upon receipt of this notification (S1401), the AV amplifier 110 determines that the user is selecting a channel (S1402), and the process moves to S1403. The AV amplifier 110 sets audio parameters suitable for "sports" and completes sound adjustment before the mute is canceled in the channel selection period. According to the category information received from the digital TV broadcast receiver 101, for example, with reference to the parameter table as illustrated in FIG. 4, the AV amplifier 110 sets audio parameters to values corresponding to the category information, thereby changing the audio parameters to new audio parameters (S1403). The AV amplifier 110 changes the audio parameters from current values to target values at once during the channel selection period (the audio parameters are changed all at once) as illustrated in FIG. 5. This process of changing the audio parameters is basically the same as previously described in the first embodiment except that not the audio/video output control mechanism 250 but a controller (not illustrated) of the AV amplifier 110 performs the process.

As described above, according to the fifth embodiment, the digital TV broadcast receiver 101 notifies the AV amplifier 110 of state information (for example, "channel switching state") together with category information for programs obtained from program information that has already been acquired. Accordingly, the AV amplifier 110 can perform appropriate sound adjustment before the mute is canceled in the channel selection period. Thus, audio parameters can be changed while the user does not notice the change in sound quality.

Figure 15:
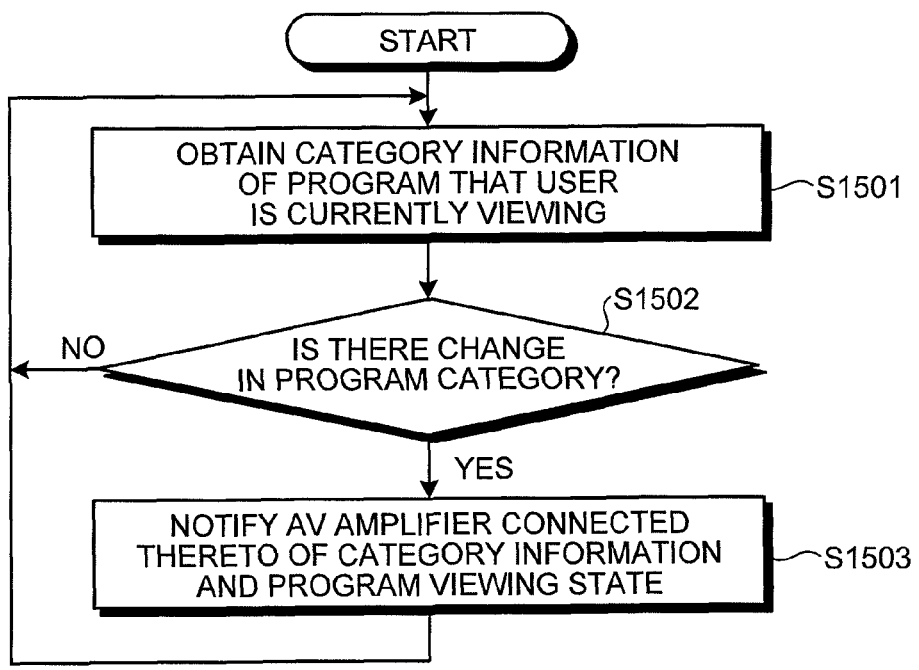
FIG. 15 is an exemplary flowchart of the operation of an audio/video output control mechanism in the sixth embodiment.

In the following, a six embodiment of the invention will be described. In the sixth embodiment, it is assumed, for example, that, when the user continuously views programs on the same channel, a program "a" changes to another program "b" and the program category also changes accordingly. With reference to FIGS. 14 and 15, a description will be given of the operation of the audio/video output control mechanism 250 and the AV amplifier 110 according to the sixth embodiment. FIG. 15 is a flowchart of the operation of the audio/video output control mechanism 250 according to the sixth embodiment.

First, the audio/video output control mechanism 250 obtains the category information of a program from a broadcast signal of a channel that the user is currently viewing (S1501). The category information thus obtained is temporarily stored in a storage medium such as the RAM 2065*b*.

Then, the audio/video output control mechanism 250 determines whether there is a change in the category of the program that the user is currently viewing (S1502). The audio/video output control mechanism 250 detects the change in program category by comparing category information previously obtained and stored in the storage medium with category information obtained this time. If the audio/video output control mechanism 250 determines that there is no change in program category (No at S1502), the process returns to S1501, and loops until the audio/video output control mechanism 250 detects a change in program category.

Having determined that there is a change in program category (Yes at S1502), the audio/video output control mechanism 250 notifies the AV amplifier 110 connected thereto of a combination of the category information and state information (in the sixth embodiment, "program viewing state") (S1503). More specifically, for example, when the category of the program that the user is viewing changes to another category while the user is not switching the channel, if the category information of a program to which the change has been detected indicates "sports", the audio/video output control mechanism 250 notifies the AV amplifier 110 of "sports" as the category information and "program viewing state" as the state information.

Upon receipt of this notification (S1401), the AV amplifier 110 determines that the user is viewing the channel (S1402) and the process moves to S1404. The AV amplifier 110 sets audio parameters suitable for "sports" step by step and gradually adjusts sound currently being listened to so that the quality of the sound does not suddenly change. This process of changing the audio parameters is basically the same as previously described in the second embodiment except that not the audio/video output control mechanism 250 but the controller (not illustrated) of the AV amplifier 110 performs the process.

Preferably, as in the third embodiment, the audio/video output control mechanism 250 calculates the end time of a program that the user is viewing, and the AV amplifier 110 controls audio parameters so that they gradually changes during a time period before the end time of the program. In this case, the audio/video output control mechanism 250 notifies the AV amplifier 110 of the category information and the state information a predetermined time period before the end time of the program. More preferably, as in the fourth embodiment, the audio/video output control mechanism 250 calculates the end time of the program that the user is viewing, and the AV amplifier 110 controls audio parameters so that they changes during a time period in which the audio level is actually low before the end time of the program. In this case, the audio/video output control mechanism 250 notifies the AV amplifier 110 of the category information and the state information at the time a decrease in audio level (the mute state or the low volume state) is actually detected.

As described above, according to the sixth embodiment, the digital TV broadcast receiver 101 notifies the AV amplifier 110 of state information (for example, "program viewing state") together with category information for programs obtained from program information. Accordingly, the AV amplifier 110 can perform appropriate sound adjustment step by step so that the quality of sound currently being listened to does not suddenly change. Thus, audio parameters can be changed while the user does not notice the change in sound quality.

Figure 16:
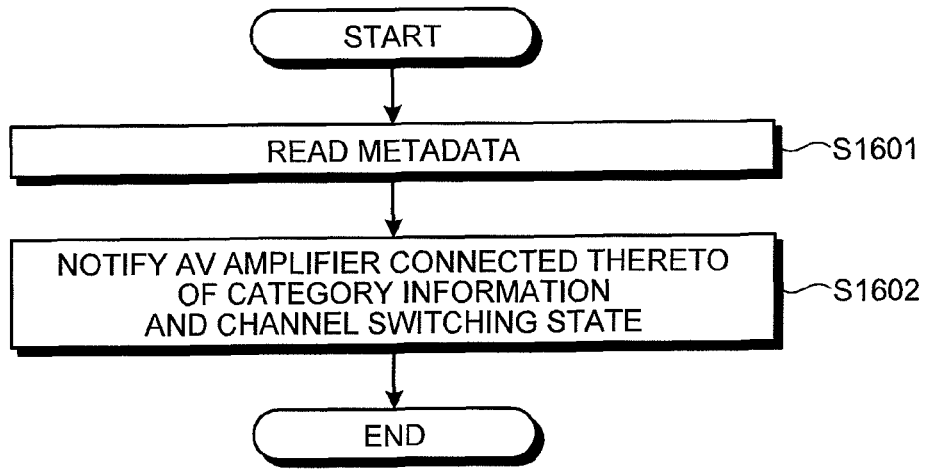
FIG. 16 is an exemplary flowchart of the operation of an audio/video output control mechanism in the modification.

In the following, a first modification of the embodiments will be described. In the first modification, it is assumed, for example, that a program recorded by a recorder such as a hard disk recorder or a digital versatile disk (DVD) recorder is reproduced. With reference to FIGS. 14 and 16, a description will be given of the operation of the audio/video output control mechanism 250 and the AV amplifier 110 according to the first modification. FIG. 16 is a flowchart of the operation of the audio/video output control mechanism 250 according to the first modification.

In the first modification, upon storing the content of a program received via digital TV broadcasting in the storage device 270 in the digital TV broadcast receiver 101, the audio/video output control mechanism 250 also stores the category information thereof (for example, "sports") as metadata. When reproducing the program stored together with the metadata in this manner, the audio/video output control mechanism 250 reads the metadata (S1601).

Subsequently, the audio/video output control mechanism 250 notifies the AV amplifier 110 connected thereto of a combination of the category information and state information (in the first modification, "channel switching state") (S1602). More specifically, when the recorded program is reproduced, if the metadata stored together indicates "sports", the audio/video output control mechanism 250 notifies the AV amplifier 110 of "sports" as the category information and "channel switching state" as the state information.

Upon receipt of this notification (S1401), the AV amplifier 110 determines that the user is selecting a channel (S1402), and the process moves to S1403. The AV amplifier 110 sets audio parameters suitable for "sports" and completes sound adjustment before the mute is canceled in the channel selection period. According to the category information received from the digital TV broadcast receiver 101, for example, with reference to the parameter table as illustrated in FIG. 4, the AV amplifier 110 sets audio parameters to values corresponding to the category information, thereby changing the audio parameters to new audio parameters (S1403). The AV amplifier 110 changes the audio parameters from current values to target values at once during the mute period (the audio parameters are changed all at once). This process of changing the audio parameters is basically the same as previously described in the first embodiment except that not the audio/video output control mechanism 250 but the controller (not illustrated) of the AV amplifier 110 performs the process. Thus, according to the first modification, with respect to a program recorded on the storage device 270, appropriate sound adjustment can be performed before the sound is output.

While the first modification is described above with a view of using the AV amplifier 110, the digital TV broadcast receiver 101 may perform the process from the start of reproduction to the sound adjustment (the change of the audio parameters) upon reproducing a recorded program. In this case, the process at which the digital TV broadcast receiver 101 notifies the AV amplifier 110 of the category information and the state information (S1602) and the process at which the AV amplifier 110 receives this notification from the digital TV broadcast receiver 101 (S1401) are skipped in the above process.

In the following, a second modification of the embodiments will be described. In the second modification, when category information changes or the digital TV broadcast receiver 101 notifies the AV amplifier 110 of category information, a message, an icon, or the like that indicates the category is displayed on the display screen of the digital TV broadcast receiver 101. By displaying the category of a program on the display screen when category information changes or when the digital TV broadcast receiver 101 notifies the AV amplifier 110 of category information, it is possible to notify the user of the detection of information related to the category.

The constituent elements described above are need not necessarily be configured as illustrated. In other words, the constituent elements may be separated or integrated as required, or some of them may be eliminated. For example, the display device 211 and the audio output device 213 may be removed form the digital TV broadcast receiver 101. Besides, while the above embodiments describes the control of audio output, video output can be controlled in a similar manner to the case of audio output. Incidentally, program information refers to information that includes category information.

Although an embodiment of the invention is described above as being applied to a digital TV broadcast recorder, this is by way of example only. For example, the embodiment may be applied to a digital TV broadcast receiver.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A broadcast receiver configured to receive a broadcast signal and output an audio signal comprised in the received broadcast signal to an external device, the broadcast receiver comprising:
 a storage module configured to store program information;
 a category information obtaining module configured to obtain first category information of a currently viewed program from the broadcast signal;
 a channel selection detector configured to detect a channel selection; and
 an audio output controller configured to control, when the channel selection detector detects the channel selection, the external device to mute audio output as well as to read program information of the selected channel from the storage module and output the program information, the audio output controller being configured to output, when the first category information of the currently viewed program obtained by the category information obtaining module is changed to second category information, the second category information so that the external device becomes capable of gradually adjusting the audio output based on the second category information while the program is currently being viewed;
 an end time calculator configured to calculate an end time of the currently viewed program based on the program information stored in the storage module;
 an extracting module configured to extract category information of a program subsequent to the currently viewed program from the program information stored in the storage module;
 a notification module configured to notify the external device of display information and the category information extracted by the extracting module at a predetermined time before the end time of the currently viewed program to adjust the audio output based on the category information, the display information indicating that the currently viewed program is currently being viewed; and
 a sound state detector configured to detect either muted or low volume of sound from audio data,
 wherein the notification module is configured to notify the external device of the category information and the display information when the sound state detector detects either muted or low volume of sound after a predetermined time before the end time of the first program.

2. An output control method of a broadcast receiver configured to receive a broadcast signal and to output an audio signal comprised in the received broadcast signal to an external device, the output control method comprising:
 obtaining first category information of a currently viewed program from the broadcast signal;
 detecting a channel selection;
 when the channel selection is detected by the detecting, controlling the external device to mute audio output, reading program information of the selected channel from the storage module, and outputting the read program information; and
 when the first category information of the currently viewed program obtained by the obtaining is changed to second category information, outputting the second category information so that the external device becomes capable of gradually adjusting the audio output based on the second category information while the program is currently being viewed;
 calculating an end time of the currently viewed program based on the program information;

extracting category information of a program subsequent to the currently viewed program from the program information;

notifying the external device of display information and the extracted category information at a predetermined time before the end time of the currently viewed program to adjust the audio output based on the external category information, the display information indicating that the currently viewed program is currently being viewed; and notifying the external device of the extracted category information and the display information when a sound state detector detects either muted or low volume of sound after a predetermined time before the end time of the first program.

* * * * *